Sept. 16, 1958    E. G. STALEY    2,852,316
SPRING ENERGIZED BRAKING SYSTEMS
Filed Sept. 1, 1955
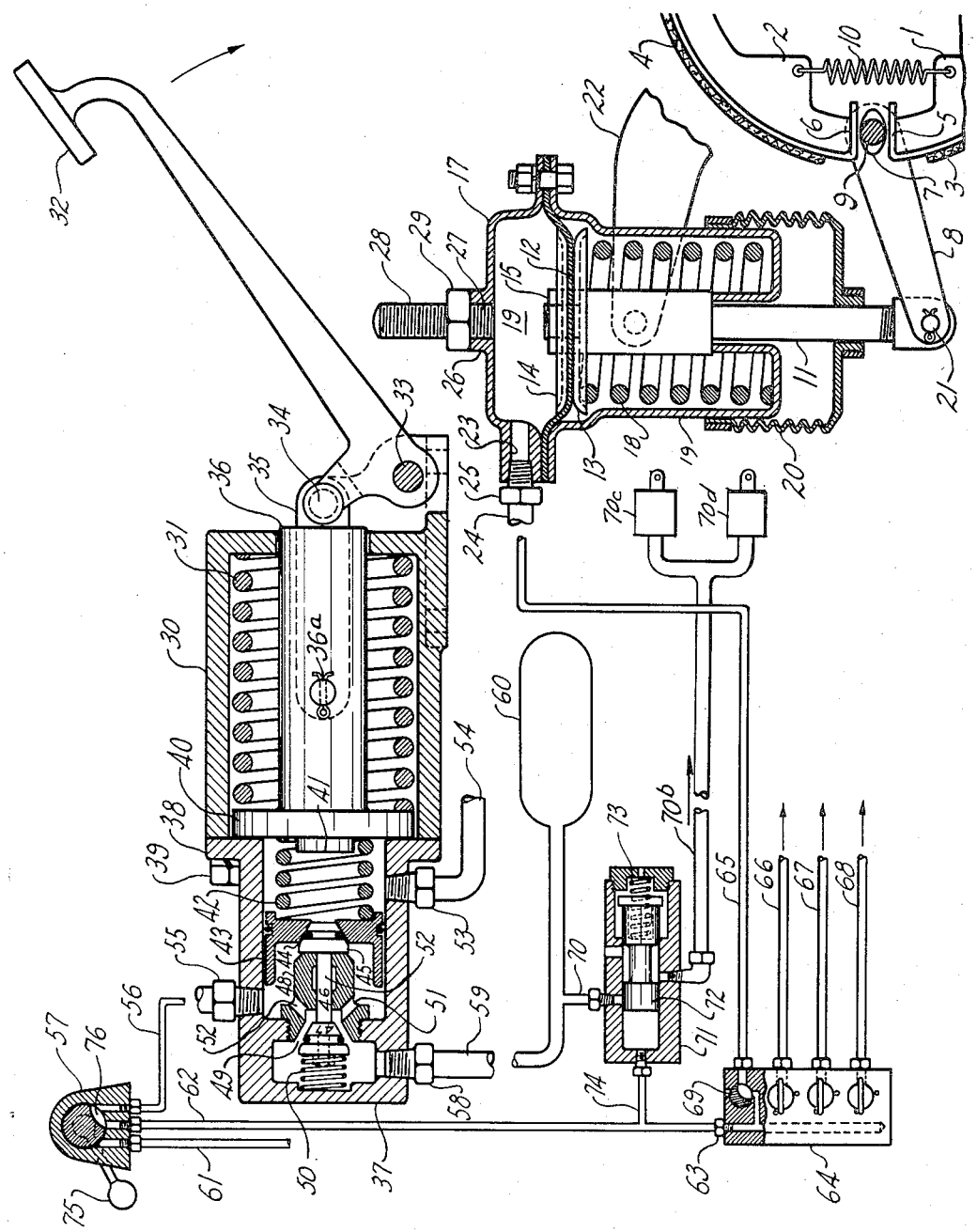
INVENTOR
Ernest G. Staley
BY William B. Jaspert.
ATTORNEY United States Patent Office 2,852,316
Patented Sept. 16, 1958

2,852,316

SPRING ENERGIZED BRAKING SYSTEMS

Ernest G. Staley, Tarentum, Pa.

Application September 1, 1955, Serial No. 532,056

1 Claim. (Cl. 303—2)

This invention relates to new and useful improvements in braking systems for automotive vehicles, more particularly trucks and the like and it is among the objects thereof to provide a pneumatically regulated spring actuated brake system which is positive in its action to automatically apply the braking force upon failure of the air supply by means of which the brake is maintained in open position.

It is a further object of the invention to provide a simple valve mechanism directly controlled by the brake pedal for cutting off the air supply for maintaining the brake mechanism in open position, the feed valve being spring controlled by the foot pedal through a spring whereby the braking action may be gradually applied.

It is another object of the invention to provide a fully pneumatically controlled braking system with individual braking units for each wheel and individual fluid lines to said braking units connected through a manifold to a common control valve with means for disconnecting each of the braking lines from the control unit.

It is a further object of the invention to provide a spring actuated air controlled braking system of the above character which shall be adapted for use with air brakes for a trailer in addition to the air controlled spring brakes for the truck, which air brakes are connected to the spring brake control system to automatically function to supply air pressure to the trailer brakes when the pressure release for actuating the spring truck brakes is effected.

These and other objects of the invention will become more apparent from a consideration of the accompanying drawing constituting a part hereof in which like reference characters designated like parts and in which the single figure is a cross-sectional elevational view diagrammatically illustrating the brake actuating mechanism and the control valves therefor embodying the principles of this invention.

In the drawing, the numerals 1 and 2 designate a pair of brake shoes having brake linings 3 and 4 for engagement with the brake drum of the vehicle wheel, not shown. The brake shoes 1 and 2 are pivotally mounted in a conventional manner and are provided with flanges 5 and 6 which are in abutting engagement with an oval shaped actuator 7 operated by a brake arm 8 pivotally mounted at 9, as shown. The brake shoes 1 and 2 are connected by a spring 10 to bias the flanges 5 and 6 into abutting engagement with the acutator 7. When the brake arm 8 is moved from the position shown in the drawing, the oval shaped actuator will displace the brake arms 1 and 2 and effect contact and braking action of the liners 3 and 4 with the brake drum.

The brake lever 8 is actuated by a spring operated pneumatically controlled brake mechanism that consists of a rod 11 connected to a diaphragm 12 by means of flange plates 13 and 14 and a nut 15. Diaphragm 12 is engaged by the casing members 16 and 17 that form a housing for a coil spring 18 and forms an air chamber 19 on one side of the diaphragm 12. The coil spring 18 seats in the end of the casing 16 and abuts the diaphragm plate 13, as shown. Rod 11 extends through a dust-proof cap 20 and is connected to brake lever 8 by a pin 21. The brake unit is mounted on an arm 22 or in any suitable manner on the chassis structure in proper position to the brake. The housing portion 17 forming the chamber 19 with the diaphragm 12, is provided with a passage 23 for connection with a fluid pressure line 24 at 25. Also, casing 17 is provided with a boss 26 having a threaded portion 27 for receiving a stud screw 28 adapted to be locked by a nut 29. The purpose of this screw is to lock the brake in open position by screwing the stud 28 in a direction to abut the end of the brake rod 11. This is for the purpose of unlocking a single wheel for repairs and the like while maintaining the braking action on the remaining wheels of the vehicle.

The operation of the brake mechanism so far described is as follows:

When air pressure is maintained in the chamber 19 the diaphragm 12 will counteract the action of the coil spring 18 to retain it in a compressed state, which is in the brake off position, as viewed in the drawing, with the elliptical actuator 7 disposed to contract the brake shoes 1 and 2. When air is exhausted from chamber 19 diaphragm 12 will be displaced by action of coil spring 18 causing the brake rod 11 to move in the direction of the chamber 19 to effect corresponding movement of the brake lever 8, which causes the actuator 7 to revolve and displace flanges 5 and 6 of the brake shoes to apply the braking pressure on the bands 4 that engage the brake drums.

By again applying air pressure in chamber 19, diaphragm 12 will displace spring 18 and return the brake to its off position.

To obtain uniform control of all of the brake mechanisms of a vehicle and for the purpose of gradually controlling the escape of the air pressure that maintains the brakes in their open position, a simple valve mechanism is employed, together with auxiliary valves which consists of the following:

A housing 30 for a spring 31 is mounted beneath the dash of the vehicle to be accessible to a brake pedal 32, the arm of which is pivoted at 33, the pedal being in the shape of a bell crank lever having a pivotal connection at 34 with a link 35 pivotally connected to a hollow plunger 36 by pin 36a. A valve housing 37 having a flanged end 38 is connected to the spring housing 30 by bolts 39 and constitutes an abutment for a cylindrical flange 40 of plunger 36. The plunger 36 is provided with a reduced end portion 41 for centering a spring 42, one end of which seats against the cylindrical flange 40 and the other end abuts a valve piston 43, the latter being provided with a V-shaped seat 44 for engaging a complementary conical shaped valve 45. Valve 45 is of a spool type connected by a shank 46 to a second conical shaped valve 47, the shank 46 being slidably mounted in a valve body 48 having a seat 49 for seating valve 47. A coil spring 50 mounted behind valve 47 normally biases the latter against the seat 49, but is counteracted by the spring 42 to maintain valve 47 in an unseated position when the brake pedal is in the off position. Air passages 51 and 52 are provided in the member 48 and the valve housing is provided with a connection 53 leading to an exhaust line 54, a connection 55 leading to an air line 56 connected to a valve generally designated by the numeral 57 and valve housing 37 is further provided with a connection 58 to an air line 59 leading to a source of compressed air such as a tank 60. The valve 57 is connected to an exhaust line 61 and an air supply line 62, the latter being connected at 63 to a manifold 64 having separate air lines 65, 66, 67 and 68 leading to the brake mechanisms of the several brake units. Each of the air lines 65 through 68 is provided with a valve 69 whereby the air supply may be disconnected from any of the braking units in making repairs and the like.

The air supply tank is also connected by the line 70 to a valve generally designated by the numeral 71, which consists of a cylindrical housing with a piston type valve 72 backed by coil spring 73 to a closed position, as shown. One end of the valve chamber is connected by a line 74 to the pressure line 62 of the braking system leading from valve 57.

Valve 57 is provided with an operating lever 75 and has a cutout portion 76, as shown, to connect and disconnect the air supply leading from valve 37 through the line 56 to connect manifold 64 to air pressure or exhaust, as desired.

The operation of the control valve for the braking mechanism is briefly as follows:

With the brake pedal in off position, as shown in the drawing, valve 47 is unseated and air pressure from tank 60 is supplied through line 59 and flows through passages 51 and 52 and thence through line 56 to the valve 57. With the latter in the position shown, the air is delivered to the pressure line 62 from which it passes to the manifold 64, thence through individual air lines 65 through 68 to the respective braking mechanism to maintain air pressure in the chambers 19 of the brake mechanisms. This is the normal condition of the braking system and all of the brakes are thus maintained in the off position.

Under the brake off setup of the valve mechanism, air pressure delivered through line 74 displaces piston 72 against a compression of the spring 73 to shut off the air supply from line 70 of tank 60. With the valve 57 set in the position shown and with the operator depressing brake pedal 32, plunger 36 will be retracted and the pressure of spring 42 is reduced so that the air pressure from the tank 60 passing through line 59 through passages 51 and 52 will displace the cylinder valve 43. Spring 50 will then cause the valve 47 to move in the direction of its seat and upon further displacement of the brake pedal 32, the cylinder valve 43 will move away from valve 45 until valve 47 has completely seated and the passage controlled by valve 45 is open. The source of air from tank 60 is thus shut off and the air in line 62 will exhaust through valve 57, line 56 and through the passage controlled by valve 45 to the exhaust line 54, thus causing all of the diaphragms 12 to collapse and the springs 18 to apply the braking force by movement of brake arms 8 and corresponding displacement movement of the actuators 7. The brakes may be applied abruptly and simultaneously by moving the valve lever 75 to connect the pressure line 62 of the brake mechanisms with the exhaust line 61.

It will be noted that by action of spring 31, the brake pedal 32 may be displaced slowly to effect a gradual bleeding of the pressure line through the exhaust line 54 of valve 37 to obtain a smooth braking action through a gradual release of the air in the diaphragm chambers 19 of the brake mechanism.

When the pressure in line 62 fails; namely, when the spring brakes are rendered effective, piston 72 of valve 71 will be moved by spring 73 to open the ports of line 70 and line 70b, thereby admitting air from the tank 60 through line 70 to the conventional air actuated brake cylinders 70c and 70d of trailers that are connected to the truck. It is, of course, evident that the spring actuated air controlled type of brake mechanism may also be used on trailer trucks and their air lines may be connected to the manifold 64 in the same manner as the lines shown in the drawing.

By means of the use of a simple spool valve in the control valve, as shown, with the sliding valve cylinder, a positive and reliable valve control is supplied, and by means of the pressure spring 31 on the brake pedal, the movement of the spool valve may be regulated to obtain a smooth braking action. It is further evident that by means of the emergency valve 57, all of the brakes may be simultaneously applied instantly by the simple movement of the lever 75.

It is further evident from the above description of the invention that a brake mechanism employing a positive pneumatic control without the use of electrically operated control elements, provides a reliable braking system in that it is independent of any other controls. Also, the pneumatic valve control system is in itself compact and readily accessible for maintenance and repairs.

Although one embodiment of the invention has been herein illustrated and described, it will be evident to those skilled in the art that various modifications may be made in the details of construction without departing from the principles herein set forth.

I claim:

In a spring energized braking system for automotive vehicles brake actuators having brake arms, brake rods connected to said arms, spring means biasing said rods to braking position, fluid pressure means acting upon said rod to counteract said spring means including diaphragms connected to said brake rods constituting a wall of a fluid pressure chamber, fluid pressure lines connected from said chambers to a common manifold, a source of pressure fluid, a valve controlling the flow of the pressure fluid from the source to said brake line manifold, spring means normally positioning said valve to maintain communication of the pressure fluid from the source through the manifold to the fluid chambers of the brake actuator, a second valve connected to said fluid pressure source and two fluid pressure lines adapted to be connected to air brake cylinders of trailer trucks, said second valve being connected to the fluid pressure line connected to the manifold to be responsive to the pressure maintained on the brake pressure chambers to disconnect the pressure source from said trailer braking cylinders and means upon failure of pressure to the first-named brake fluid chambers to position the second-named valve to connect the trailer brake cylinders with the fluid pressure source.

References Cited in the file of this patent

UNITED STATES PATENTS

| | | |
|---|---|---|
| 2,258,784 | McNeal | Oct. 14, 1941 |
| 2,466,837 | Bohr | Apr. 12, 1949 |
| 2,525,461 | Schnell | Oct. 10, 1950 |